(12) United States Patent
Yamamoto et al.

(10) Patent No.: US 8,161,870 B2
(45) Date of Patent: Apr. 24, 2012

(54) HEATING COOKER

(75) Inventors: Yoshikazu Yamamoto, Kadoma (JP);
Masahiro Nishijima, Goze (JP);
Toshiaki Ueki, Hashimoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 1120 days.

(21) Appl. No.: 11/997,539

(22) PCT Filed: Jul. 26, 2006

(86) PCT No.: PCT/JP2006/314734
§ 371 (c)(1),
(2), (4) Date: Jan. 31, 2008

(87) PCT Pub. No.: WO2007/015398
PCT Pub. Date: Feb. 8, 2007

(65) Prior Publication Data
US 2009/0038481 A1 Feb. 12, 2009

(30) Foreign Application Priority Data

Aug. 1, 2005 (JP) .................................. 2005-222954

(51) Int. Cl.
*H05B 6/64* (2006.01)
*A47J 27/00* (2006.01)

(52) U.S. Cl. .......................................... 99/330; 219/682

(58) Field of Classification Search .................... 99/330, 99/354, 415, 476; 219/439, 682, 401
See application file for complete search history.

(56) References Cited

U.S. PATENT DOCUMENTS

| | | | | |
|---|---|---|---|---|
| 3,022,722 A * | 2/1962 | Arvan | | 99/354 |
| 3,769,958 A * | 11/1973 | Kozinczuk | | 126/20 |
| 4,189,995 A | 2/1980 | Lohr et al. | | |
| 4,449,026 A * | 5/1984 | Satoh | | 219/682 |
| 5,010,806 A | 4/1991 | Narcisi et al. | | |
| 5,515,773 A * | 5/1996 | Bullard | | 99/330 |
| 5,631,033 A * | 5/1997 | Kolvites | | 426/233 |
| 5,649,476 A * | 7/1997 | Montagnino et al. | | 99/415 |
| 5,865,108 A * | 2/1999 | Montagnino et al. | | 99/476 |
| 6,232,587 B1 | 5/2001 | Kurita et al. | | |
| 6,833,032 B1 * | 12/2004 | Douglas et al. | | 134/3 |
| 6,956,190 B2 * | 10/2005 | Sano et al. | | 219/682 |
| 7,810,488 B2 * | 10/2010 | Manganiello et al. | | 126/369.2 |
| 2004/0245238 A1 * | 12/2004 | De'Longhi | | 219/439 |
| 2005/0145622 A1 * | 7/2005 | Sano et al. | | 219/682 |
| 2006/0289439 A1 * | 12/2006 | Dreimann et al. | | 219/401 |

(Continued)

FOREIGN PATENT DOCUMENTS

EP 1914479 A1 * 4/2008

(Continued)

*Primary Examiner* — Mitra Aryanpour
(74) *Attorney, Agent, or Firm* — Birch, Stewart, Kolasch & Birch, LLP

(57) ABSTRACT

A heating cooker includes a steam generator for generating steam for heating cooking, a removable water tank for storing water to be supplied to the steam generator, a pump 35 for supplying water from the water tank to the steam generator, a drain valve 70 for draining water within the steam generator into the water tank, a first timer TM1 which starts counting when water is supplied to the steam generator by the pump 35, and an operation panel 11 including a notification section for notifying of draining the water within the water tank. When the first timer TM1 has counted over a first specified time, the control unit 80 makes the operation panel 11 notify of draining the water within the water tank.

10 Claims, 7 Drawing Sheets

U.S. PATENT DOCUMENTS

| | | | |
|---|---|---|---|
| 2006/0289441 A1* | 12/2006 | Bartelick | 219/401 |
| 2007/0183555 A1 | 8/2007 | Kaneko et al. | |
| 2008/0283040 A1* | 11/2008 | Manganiello et al. | 126/369.2 |
| 2009/0007798 A1* | 1/2009 | Yamaguchi et al. | 99/330 |
| 2009/0038481 A1* | 2/2009 | Yamamoto et al. | 99/330 |
| 2009/0238937 A1* | 9/2009 | Yamazaki et al. | 426/407 |
| 2010/0126356 A1* | 5/2010 | Yamamoto et al. | 99/330 |
| 2010/0199860 A1* | 8/2010 | Seitz et al. | 99/468 |
| 2010/0229896 A1* | 9/2010 | Bartelick | 134/22.1 |
| 2010/0230397 A1* | 9/2010 | Ohashi et al. | 219/401 |

FOREIGN PATENT DOCUMENTS

| | | |
|---|---|---|
| JP | 54-46662 A | 4/1979 |
| JP | 54-127769 A | 10/1979 |
| JP | 55-87412 U | 6/1980 |
| JP | 1-169902 U | 11/1989 |
| JP | 4-53483 U | 5/1992 |
| JP | 6-82049 A | 3/1994 |
| JP | 6-241406 A | 8/1994 |
| JP | 7-243649 A | 9/1995 |
| JP | 09-004849 A | 1/1997 |
| JP | 9-26140 A | 1/1997 |
| JP | 10-110903 A | 4/1998 |
| JP | 10-253006 A | 9/1998 |
| JP | 11-33045 A | 2/1999 |
| JP | 11-94203 A | 4/1999 |
| JP | 2003-262338 A | 9/2003 |
| JP | 2004-11995 A | 1/2004 |
| JP | 2005-265378 A | 9/2005 |
| JP | 2007040565 A * | 2/2007 |

* cited by examiner

HEATING COOKER

BACKGROUND OF THE INVENTION

1. Field of the Invention

The present invention relates to a heating cooker.

2. Description of the Related Art

Conventionally, there has been provided a heating cooker in which a steam generator is supplied with water from a water supply tank movably fitted to the cooker main body (see, e.g., JP 2004-11995 A). In this heating cooker, elapsed time starting from the fitting of the water supply tank to the main body is counted by a timer. Then, if the elapsed time is determined to be over a specified time period, a notification of a water replacement request on the water supply tank is made by a notification means. As a result of this, hygienically problematic old water in the water supply tank is prevented from being used for steam generation.

However, in this heating cooker, since remaining water after heating within the steam generator, from which chlorine has been evaporated, is liable to corrosion, leaving the water remaining within the steam generator as it is after heating cooking would be unhygienic for cooking of foods and is a problem.

Accordingly, the inventors of the present invention have made a heating cooker in which water remaining within the steam generator after heating cooking is drained into a tank for storage of water to be supplied to the steam generator and then water returned to the tank is recycled. It is noted that this heating cooker is explained for an easier understanding only, and is neither a known technique nor a prior art.

In this heating cooker, since corrosion-prone remaining water within the steam generator after heating is returned to the tank, the degree of deterioration of water quality within the tank varies largely depending on the drain frequency of the water within the steam generator. As a result, only by notification of a water replacement request on the tank at a time of elapse of a specified time period since a fitting of the tank to the main body, an optimum water replacement responsive to the deterioration of water quality within the tank could not be achieved.

SUMMARY OF THE INVENTION

Accordingly, an object of the present invention is to provide a heating cooker in which remaining water within the steam generator is drained into a tank for storage of water to be supplied to the steam generator so as to allow the recycling use of the remaining water, the heating cooker being capable of an optimum water replacement responsive to deterioration of water quality within the tank.

In order to achieve the above object, according to the present invention, there is provided a heating cooker comprising:

a steam generator for generating steam for heating cooking;

a removable tank for storing water to be supplied to the steam generator;

a water supply section for supplying water from the tank to the steam generator;

a drain section for draining water within the steam generator into the tank;

a first timer which starts counting when water is supplied to the steam generator by the water supply section;

a notification section for notifying of draining the water within the tank;

a control unit for controlling the water supply section, the drain section and the notification section, wherein when the first timer has counted over a first specified time, the control unit makes the notification section notify of draining the water within the tank.

In this heating cooker, water is supplied from the tank to the steam generator by the water supply section, and steam generated by the steam generator is used for heating cooking. Then, remaining water in the steam generator after heating cooking is drained to the tank by the drain section, thereby preventing corrosion of residual water in the steam generator, and moreover remaining water in the steam generator after the heating cooking is returned to the tank so as to be recycled. In this heating cooker, when water is supplied to the steam generator by the water supply section, the first timer is started to count. Then, at the time when the first timer counts over the first specified time, the control unit makes the notification section notify the user to drain the water within the tank. As a result, the user, after removing the tank and draining the water in the tank, sets up the tank in which new water has been contained. Thus, an optimum water replacement responsive to deterioration of the water quality in the tank can be achieved.

One embodiment comprises a tank sensor for detecting a fitting/removal state of the tank, wherein when the control unit has made the drain section drain the water within the steam generator and moreover the tank sensor detects that the tank has been removed after the draining, the control unit resets the first timer.

In this embodiment, after the control unit has made the drain section drain the water in the steam generator and when the tank sensor detects that the tank has been removed, the control unit resets the first timer. Therefore, with the tank set up at the next time, when water is supplied to the steam generator by the water supply section, the first timer for drain control of the tank can be started to count anew.

One embodiment comprises a second timer which starts counting when, after completion of heating cooking, generation of steam by the steam generator is ended, wherein when the second timer has counted over a second specified time, the control unit makes the drain section drain the water within the steam generator.

In this embodiment, when steam generation by the steam generator is ended after an end of heating cooking, the second timer is started to count. Then, when the second timer has counted over the second specified time, the control unit makes the drain section drain the water in the steam generator. Accordingly, high-temperature water in the steam generator after heating cooking is not drained immediately, but drained as it has been cooled to some extent, so that the drain path and the tank can be prevented from being damaged by high heat.

One embodiment comprises a tank water level sensor for detecting a water level within the tank, wherein when the second timer has counted over the second specified time and moreover the water level within the tank detected by the tank water level sensor is not at a fullness of water, the control unit makes the drain section drain the water within the steam generator.

In this embodiment, when the second timer has counted over the second specified time and moreover the water level in the tank detected by the tank water level sensor is not at a fullness of water, the control unit makes the drain section drain the water within the steam generator. Accordingly, it can be prevented that draining water within the steam generator with the water level in the tank at a fullness of water causes water to overflow from within the tank.

In one embodiment, when the second timer has counted over the second specified time and moreover the water level within the tank detected by the tank water level sensor is at a fullness of water, the control unit makes the notification section notify of draining the water within the tank.

In this embodiment, when the second timer has counted over the second specified time and moreover the water level in the tank detected by the tank water level sensor is at a fullness of water, the control unit makes the notification section notify the user to drain the water within the tank. As a result, the user may remove the tank to drain the water within the tank and then set up the empty or reduced-in-water-quantity tank, by which water within the steam generator can be drained into the tank.

One embodiment comprises a tank sensor for detecting a fitting/removal state of the tank, wherein the notification section has a function of notifying of setting up the tank, and when the second timer has counted over the second specified time and moreover the tank sensor detects that the tank is not set up, the control unit makes the notification section notify of setting up the tank.

In this embodiment, when the second timer has counted over the second specified time and moreover the tank sensor detects that the tank is not set up, the control unit makes the notification section notify the user to set up the tank. As a result, the user may set up the empty or reduced-in-water-quantity tank, by which water within the steam generator can be drained into the tank.

In one embodiment, when the water within the steam generator is drained by the drain section, the control unit resets the second timer.

In this embodiment, when the water within the steam generator is drained by the drain section, the control unit resets the second timer. Therefore, with water supplied to the steam generator at the next time and after completion of heating cooking, when the steam generation by the steam generator is ended, the second timer for drain control of the steam generator can be started to count anew.

One embodiment comprises a water temperature sensor for detecting a water temperature in the steam generator, wherein when a water temperature in the steam generator detected by the water temperature sensor after completion of heating cooking and moreover after an end of generation of steam by the steam generator has become a specified temperature or lower, the control unit makes the drain section drain the water within the steam generator.

In this embodiment, after completion of heating cooking and moreover after an end of the steam generation by the steam generator, when the water temperature in the steam generator detected by the water temperature sensor has become the specified temperature or lower, the control unit makes the drain section drain the water within the steam generator. Setting the specified temperature for this operation to, for example, 60° C. involves awaiting the drain until the water within the steam generator becomes low temperature. Accordingly, high-temperature water in the steam generator after heating cooking is not drained immediately, but drained as it has been cooled to some extent, so that the drain path and the tank can be prevented from being damaged by high heat.

One embodiment comprises a key input section for outputting to the control unit a signal corresponding to an inputted key, wherein when the first timer has counted over the first specified time, the control unit does not accept at least keys for performing heating cooking provided in the key input section.

In this embodiment, when the first timer has counted over the first specified time, the control unit does not accept any keys for performing heating cooking in the key input section, so that heating cooking is not started. Thus, it can be prevented that cooking is performed by using the water of deteriorated quality within the tank.

As apparent from the foregoing description, according to the heating cooker of the present invention, there is provided a heating cooker in which remaining water within the steam generator is drained into a tank for storage of water to be supplied to the steam generator so as to allow the recycling use of the remaining water, the heating cooker being capable of an optimum water replacement responsive to deterioration of water quality within the tank.

DETAILED DESCRIPTION OF THE INVENTION

Hereinbelow, the heating cooker of the present invention will be described in detail by way of an embodiment thereof illustrated in the accompanying drawings.

Figure 1:
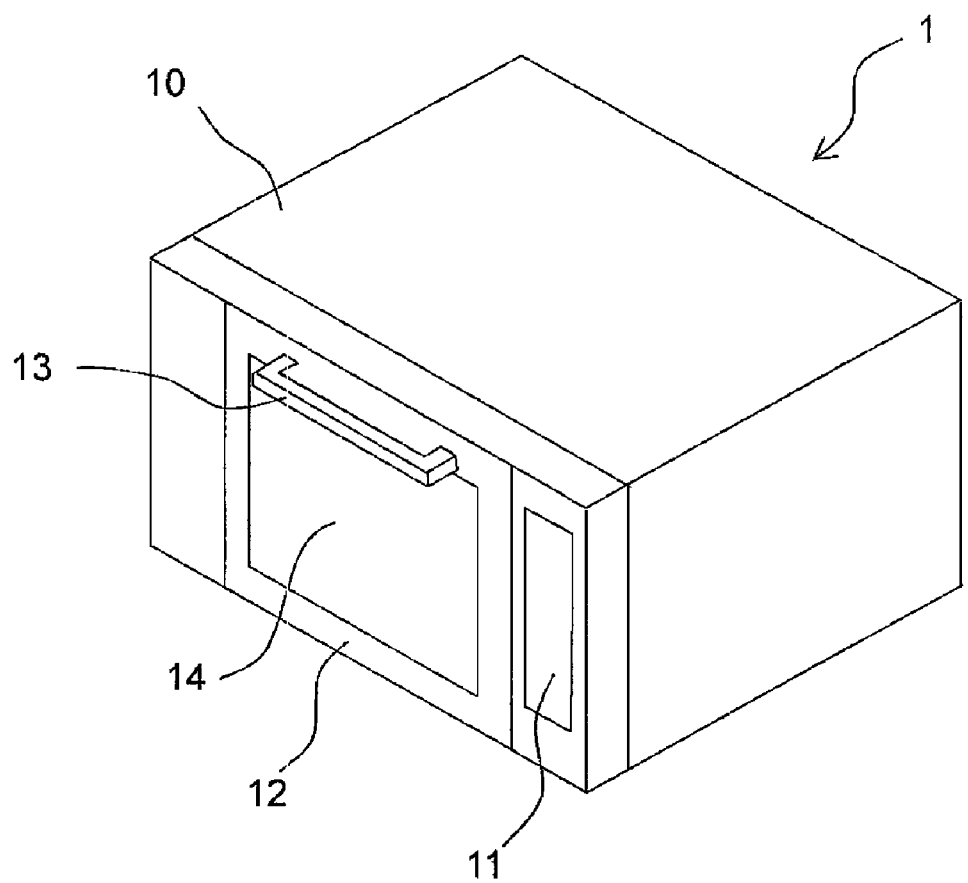
FIG. 1 is a perspective view showing an external appearance of a heating cooker according to one embodiment of the present invention.

FIG. 1 is a perspective view showing an external appearance of a heating cooker 1 according to one embodiment of the invention, in which a door 12 that pivots roughly about a side on the lower end side is provided at the front of a rectangular parallelepiped main body casing 10. An operation panel 11 including a key input section and a notification section is provided at the right of the door 12, a handle 13 is provided at an upper portion of the door 12, and a window 14 made of a heat-resistant glass is provided at a roughly central portion of the door 12.

Figure 2:
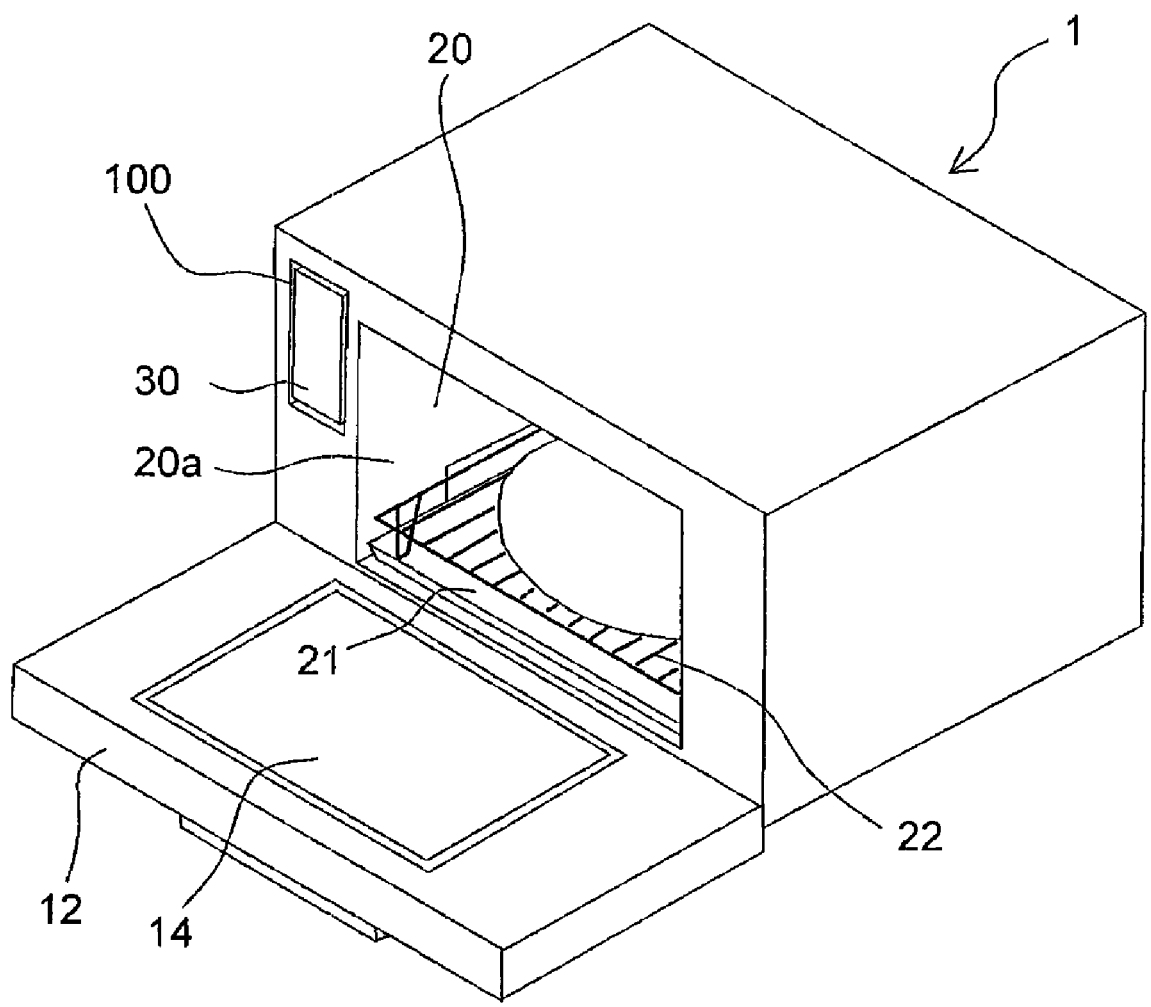
FIG. 2 is a perspective view showing an external appearance of the heating cooker with its door opened.

FIG. 2 is a perspective view showing an external appearance of the heating cooker 1 with its door 12 opened, where a rectangular parallelepiped heating chamber 20 is provided in the main body casing 10. The heating chamber 20 has an opening 20a on the front side facing the door 12, and a side face, a bottom face and a top face of the heating chamber 20 are each formed of a stainless steel plate. Moreover, a side of the door 12 facing the heating chamber 20 is formed of a stainless steel plate. A heat insulating material (not shown) is placed around the heating chamber 20 and inside the door 12 so that interior and exterior of the heating chamber 20 are insulated from each other.

Moreover, a catch pan 21 made of stainless steel is placed on the bottom surface of the heating chamber 20, and a rack 22 made of stainless steel wires on which an object to be cooked is to be placed is put on the catch pan 21. It is noted that the upper surface side of the door 12 is roughly horizontal in the state in which the door 12 is opened, and the object to be cooked can be temporarily placed on the door 12 when taken out.

Further, a water tank accommodating portion 100 for accommodating a removable water tank 30 is provided at the left of the heating chamber 20 of the main body casing 10. The water tank 30 is inserted into the water tank accommodating portion 100 from the front surface side toward the back surface side.

Figure 3:
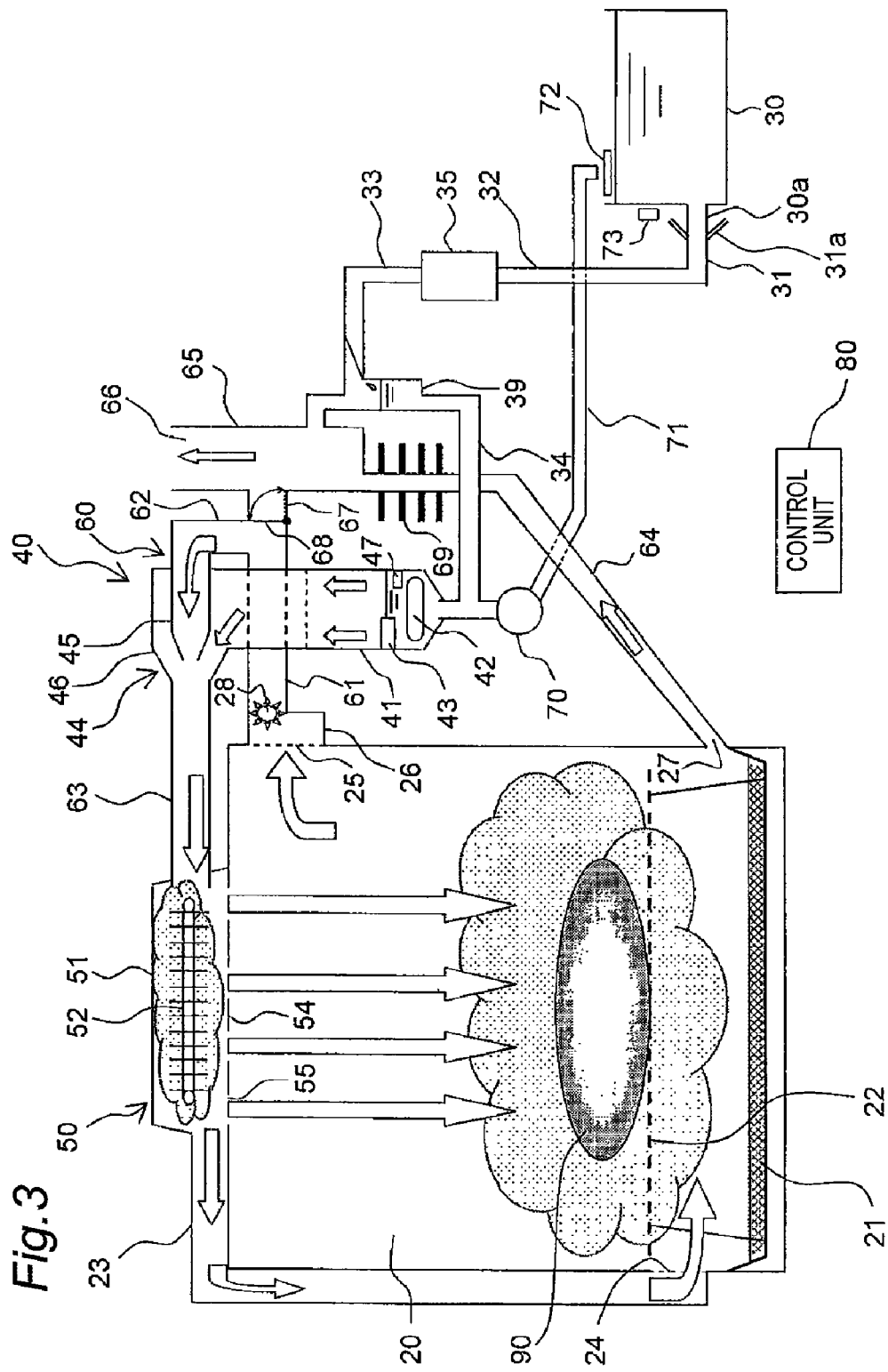
FIG. 3 is a schematic constructional view showing a basic construction of the heating cooker.

FIG. 3 is a schematic constructional view showing a basic construction of the heating cooker 1. As shown in FIG. 3, the heating cooker 1 includes the heating chamber 20, the water tank 30 for storing water for use as steam, a steam generator 40 for vaporizing water supplied from the water tank 30, a steam temperature-raising device 50 for heating steam derived from the steam generator 40, and a control unit 80 for controlling the steam generator 40, the steam temperature-raising device 50 and the like.

The grid-like rack 22 is put on the catch pan 21 placed in the heating chamber 20, and an object to be cooked 90 is placed at a roughly center of the rack 22.

Also, a connecting portion 30a provided at a lower side of the water tank 30 is connected to a funnel-like receiving port 31a provided in a joint part 31. The intake side of a pump 35 as an example of a water supply section is connected to the other end of a first water supply pipe 32 extending upward from the joint part 31, one end of a second water supply pipe 33 is connected to the discharge side of the pump 35. In a vicinity of the joint part 31 is placed a water tank sensor 73 for detecting a fitting/removal state of the water tank 30.

Then, the second water supply pipe 33 is L-shaped so that a horizontal portion is bent roughly horizontally from a vertically-positioned portion, and an auxiliary tank 39 is connected to the other end of the second water supply pipe 33. One end of a third water supply pipe 34 is connected to a lower end of the auxiliary tank, and the other end of the third water supply pipe 34 is connected to a lower end of the steam generator 40. Also, one end of a drain valve 70 as an example of a drain section is connected to a lower end of the steam generator 40 to which the third water supply pipe 34 is connected. Then, one end of a drain pipe 71 is connected to the other end of the drain valve 70, and the other end of the drain pipe 71 is connected to an upper side of the water tank 30. A filter 72 is placed on the other-end lower side of the drain pipe 71 extending toward the water tank 30. It is noted that the upper side of the auxiliary tank 39 communicates with the air via an exhaust gas duct 65.

The steam generator 40 has a pot 41 wherein the other end of the third water supply pipe 34 is connected to the lower side of the pot 41, a heater part 42 placed near the bottom face within the pot 41, a pot water level sensor 43 placed near an upper side of the heater part 42 within the pot 41, a pot water temperature sensor 47 placed within the pot 41, and a steam suction ejector 44 fitted on the upper side of the pot 41. Then, a fan casing 26 is disposed outside intake openings 25 provided in an upper portion of a side face of the heating chamber 20. By a blower fan 28 placed within the fan casing 26, steam in the heating chamber 20 is sucked in through the intake openings 25. The sucked steam is fed toward the inlet side of the steam suction ejector 44 of the steam generator 40 via a first pipe 61 and a second pipe 62. The first pipe 61, which is positioned roughly horizontal, has one end connected to the fan casing 26. Also, the second pipe 62, which is positioned roughly vertical, has one end connected to the other end of the first pipe 61 and the other end connected to the inlet side of an inner nozzle 45 of the steam suction ejector 44.

The steam suction ejector 44 has an outer nozzle 46 covering the outer side of the inner nozzle 45, the inner nozzle 45 communicating on its discharge side with the internal space of the pot 41. Then, the discharge side of the outer nozzle 46 of the steam suction ejector 44 is connected to one end of a third pipe 63, and the steam temperature-raising device 50 is connected to the other end of the third pipe 63.

The fan casing 26, the first pipe 61, the second pipe 62, the steam suction ejector 44, the third pipe 63 and the steam temperature-raising device 50 constitute a circulation path 60. Also, one end of a discharge passage 64 is connected to an exhaust gas outlet 27 provided on a lower side in a side face of the heating chamber 20, and the other end of the discharge passage 64 is connected to one end of the exhaust gas duct 65. An exhaust gas outlet 66 is provided at the other end of the exhaust gas duct 65. A radiator 69 is externally fitted on one side of the discharge passage 64 closer to the exhaust gas duct 65.

Then, a connecting portion between the first pipe 61 and the second pipe 62 forming the circulation path 60 is connected to the exhaust gas duct 65 via a discharge path 67. On one side of the discharge path 67, on which the first, second pipes 61, 62 are connected to each other, a damper 68 for opening and closing the discharge path 67 is placed.

The steam temperature-raising device 50 has a tray-shaped case 51 placed at a ceiling-sided roughly center of the heating chamber 20 with its opening downward, and a steam superheater 52 placed within the tray-shaped case 51. A bottom face of the tray-shaped case 51 is formed of a metallic ceiling panel 54 provided at the ceiling face of the heating chamber 20. In the ceiling panel 54, a plurality of ceiling steam outlets 55 are formed. Also, the ceiling panel 54 has upper and lower two sides finished in a dark color by coating or the like. The ceiling panel 54 may also be formed from a metal material that discolors into a dark color through repeated use or from a dark-colored ceramic molded product.

Further, steam supply passages 23 (only one is shown in FIG. 3) extending on both right and left sides of the heating chamber 20 are connected at the respective ends to the steam temperature-raising device 50. Then, the other ends of the steam supply passages 23 extend downward along both side faces of the heating chamber 20 so as to be connected to side steam outlets 24 provided at both side-face lower portions of the heating chamber 20, respectively.

Figure 4:
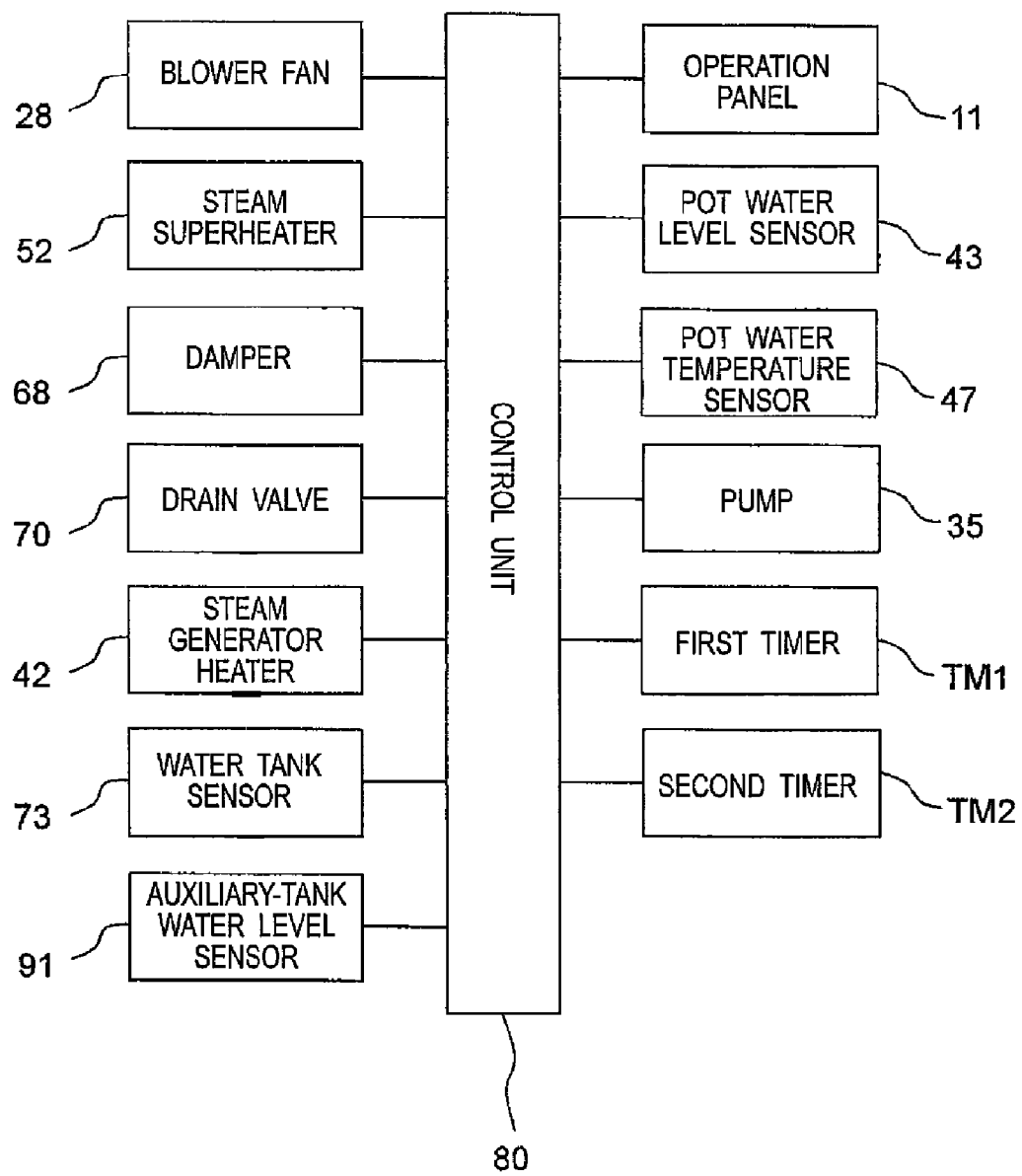
FIG. 4 is a control block diagram of the heating cooker.

Next, a control block of the heating cooker 1 shown in FIG. 4 is explained.

As shown in FIG. 4, connected to the control unit 80 are the blower fan 28, the steam superheater 52, the damper 68, the drain valve 70, the steam generator heater 42, the water tank sensor 73, a water-tank water level sensor 36 (described later), an auxiliary-tank water level sensor 91 (described later), the operation panel 11, the pot water level sensor 43, the pot water temperature sensor 47, and the pump 35. Also connected to the control unit 80 are a first timer TM1 for drain control of the water tank 30, and a second timer TM2 for drain control of water within the pot 41 of the steam generator 40. The operation panel 11 outputs a signal corresponding to an inputted key to the control unit 80.

The control unit 80, which is made up of a microcomputer and input/output circuits and the like, controls the blower fan 28, the steam superheater 52, the damper 68, the drain valve 70, the steam generator heater 42, the operation panel 11 and the pump 35, according to specified programs, based on signals derived from the operation panel 11, the pot water level sensor 43, the pot water temperature sensor 47, the water tank sensor 73, the water-tank water level sensor 36 and the auxiliary-tank water level sensor 91 as well as signals derived from the first, second timers TM1, TM2.

In the heating cooker 1 constructed as described above, when a power switch (not shown) in the operation panel 11 is pressed, the power is turned on, and heating cooking operation is started by operation of the operation panel 11. Then, the control unit 80 first closes the drain valve 70, and starts operation of the pump 35 with the discharge path 67 closed by the damper 68. By the pump 35, water is supplied from the water tank 30 into the pot 41 of the steam generator 40 via the first to third water supply pipes 32-34. Then, when it is detected by the pot water level sensor 43 and the auxiliary-tank water level sensor 91 that the water level in the pot 41 has reached a specified water level, the pump 35 is stopped to stop the water supply. In this case, although the pot water level sensor 43 and the auxiliary-tank water level sensor 91 are used to detect the water level in the pot 41, the water level in the pot 41 may also be detected by using the auxiliary-tank water level sensor 91 only.

Next, the steam generator heater 42 is turned on, a specified amount of water accumulated in the pot 41 is heated by the steam generator heater 42.

Next, simultaneously with the turn-on of the steam generator heater 42 or at the time when the temperature of the water in the pot 41 has reached a specified temperature (e.g., 60° C.), the blower fan 28 is turned on while the steam superheater 52 of the steam temperature-raising device 50 is turned on. Then, the blower fan 28 sucks in air (including steam) in the heating chamber 20 through the intake openings 25, blowing off the air (including steam) into the circulation path 60. Since a centrifugal fan is used as the blower fan 28, higher pressure can be generated as compared with propeller fans. Further, rotating the centrifugal fan used as the blower fan 28 by a DC motor at high speed makes it possible to greatly enhance the flow velocity of the circulating air flow.

Next, when the water in the pot 41 of the steam generator 40 is boiled, saturated steam is generated, and the generated saturated steam is merged at the steam suction ejector 44 with the circulating air flow passing through the circulation path 60. The steam going out from the steam suction ejector 44 flows at high speed into the steam temperature-raising device 50 via the third pipe 63.

Then, the steam flowing into the steam temperature-raising device 50 is heated by the steam superheater 52 so as to be superheated steam of roughly 300° C. (which differs depending on contents of the cooking). Part of the superheated steam is jetted out downward in the heating chamber 20 through the plurality of ceiling steam outlets 55 provided in the lower ceiling panel 54. Another part of the superheated steam is jetted out through the side steam outlets 24 in both side faces of the heating chamber 20 via the steam supply passages 23 provided on both right and left sides of the steam temperature-raising device 50.

In this case, within the heating chamber 20, there occurs convection of steam that ascends in central portion and descends in its outer side. Then, the convectional steam is sucked into the intake openings 25 in succession, repeating the circulation of passing through the circulation path 60 to return into the heating chamber 20 again.

In this manner, by forming a convective superheated steam flow in the heating chamber 20, it becomes possible to jet superheated steam, which is sent from the steam temperature-raising device 50, from the ceiling steam outlets and the side steam outlets 24 so that it efficiently collides with the object 90 placed on the rack 22, while maintaining uniform temperature, humidity distribution in the heating chamber 20. Then, collision of superheated steam heats the object 90. At this time, superheated steam in contact with a surface of the object 90 heats the object 90 also by releasing latent heat that is generated when building up condensation on the surface of the object 90. Thus, a large quantity of heat of the superheated steam can uniformly be imparted to the entire surface of the object 90 surely and promptly. Therefore, uniform cooking that secures a good finish can be realized. In addition, since the interior of the heating chamber 20 filled with superheated steam becomes as low in oxygen concentration as about 1%, oxidation of the object 90 is suppressed, so that its vitamin C and the like are not impaired.

In the above heating cooking operation, an amount of steam in the heating chamber 20 increases with a lapse of time, and an excess amount of steam is discharged outside from the exhaust gas outlet 66 via the exhaust gas outlet 27, the discharge passage 64 and the exhaust gas duct 65. At this time, a radiator 69 provided on the discharge passage 64 cools steam passing the discharge passage 64 to form condensation, by which steam is prevented from being discharged to the outside as such. Water condensed by the radiator 69 within the discharge passage 64 runs down the discharge passage 64, is led to the catch pan 21, and disposed of together with water generated by cooking after completion of the cooking.

After completion of the cooking, the control unit 80 displays a message of completion of the cooking on the operation panel 11, and an sound is raised by a buzzer (not shown) provided on the operation panel 11. A user who has been noticed thereby the completion of the cooking opens the door 12. Then, the control unit 80, detecting the opening of the door 12 by means of a sensor (not shown), instantaneously opens the damper 68 of the discharge path 67. Thus, the first pipe 61 of the circulation path 60 communicates with the exhaust gas duct 65 via the discharge path 67, so that steam in the heating chamber 20 is discharged by the blower fan 28 from the exhaust gas outlet 66 via the intake openings 25, the first pipe 61, the discharge path 67 and the exhaust gas duct 65. The operation of the damper is the same even if the user opens the door 12 while cooking. Therefore, the user can safely take out the object 90 from the inside of the heating chamber 20 without being exposed to steam.

Figure 5:
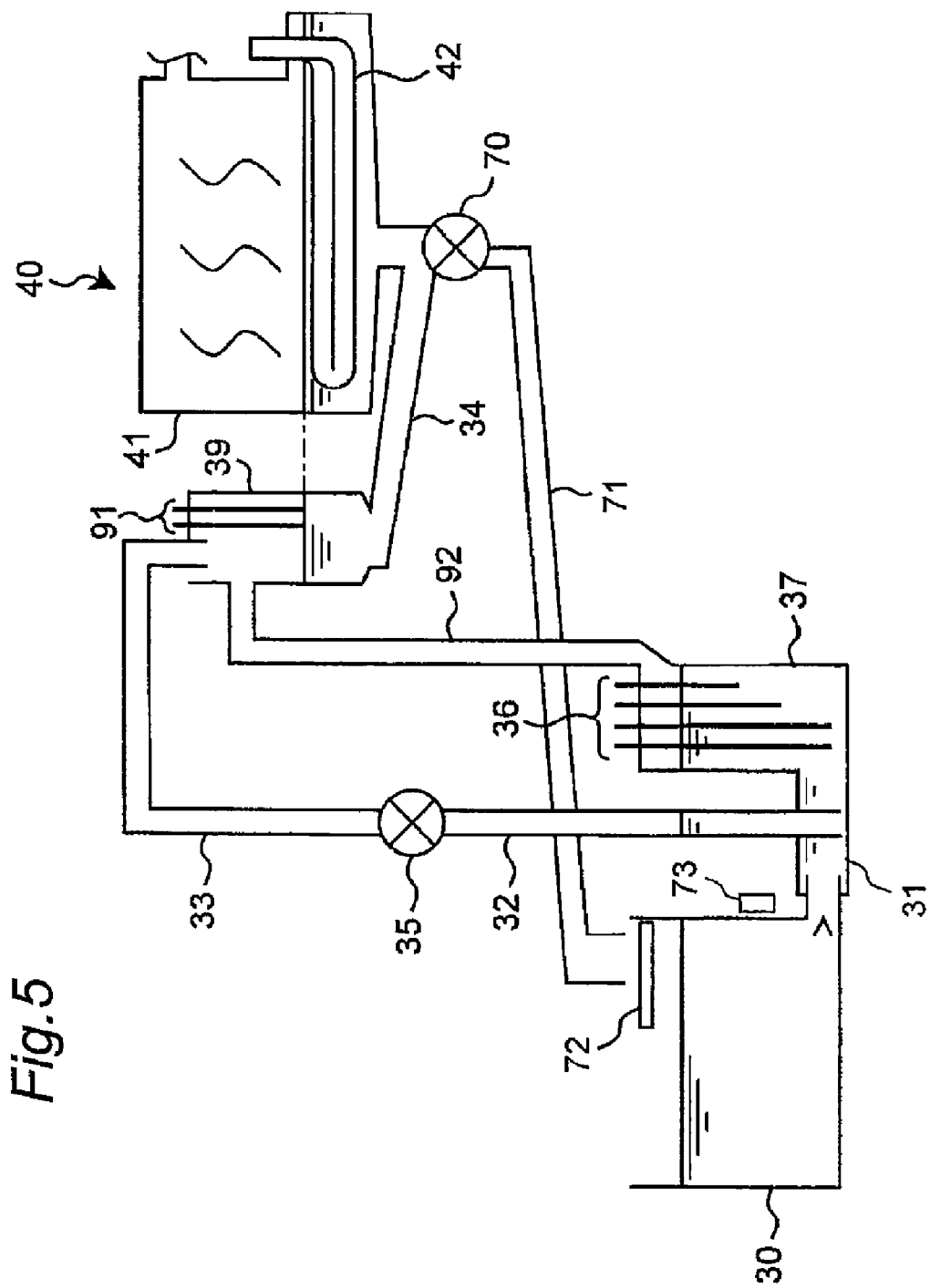
FIG. 5 is a schematic view showing a construction of a main part of the heating cooker.

FIG. 5 is a schematic view for explaining a device which detects a water level within the pot 41 of the steam generator 40 as well as a water level within the water tank 30. Unshown part of the basic construction of the heating cooker 1 shown in FIG. 3 is as follows. The auxiliary-tank water level sensor 91 is placed in the auxiliary tank 39, which is communicated with a bottom portion of the pot 41 by the third water supply pipe 34 and which is opened to the atmospheric air. There is also provided a drain path 92 for returning water, which has overflowed from the auxiliary tank 39, to a sensor unit 37. In the sensor unit 37, the water-tank water level sensor 36 is placed.

Further, water within the pot 41 discharged through the drain valve 70 is returned to the water tank 30 via the drain pipe 71 and the filter 72.

In this case, the auxiliary-tank water level sensor 91, which is provided in the auxiliary tank 39 that is not directly heated, does not need considering heat resistance or deposition of scale or the like, and is used in a space opened to the atmospheric air, thus allowing various water level detection methods to be used therefor. In addition, in this embodiment, the water level detection method for the auxiliary-tank water level sensor 91 is not limited to one using electrodes, and other methods may also be used for water level detection.

In the above construction, when the water tank 30 is connected to the joint part 31, water flows into the sensor unit 37 via the joint part 31, so that the water increases within the sensor unit 37 until its water level becomes flush with that of the water tank 30. Thus, the water level within the sensor unit 37 is detected by the water-tank water level sensor 36, by which the water level within the water tank 30 is detected.

Then, as the pump 35 is driven with the drain valve 70 closed, water is supplied from the water tank 30 into the auxiliary tank 39. Since the bottom portion of the auxiliary tank 39 is communicated with the bottom portion of the pot 41 via the third water supply pipe 34, water is supplied also into the pot 41 via the third water supply pipe 34, so that the water level within the pot 41 normally keeps flush with that of the auxiliary tank 39. Thus, the water level within the auxiliary tank 39 is detected by the auxiliary-tank water level sensor 91, by which the water level within the pot 41 is detected.

Figure 6:
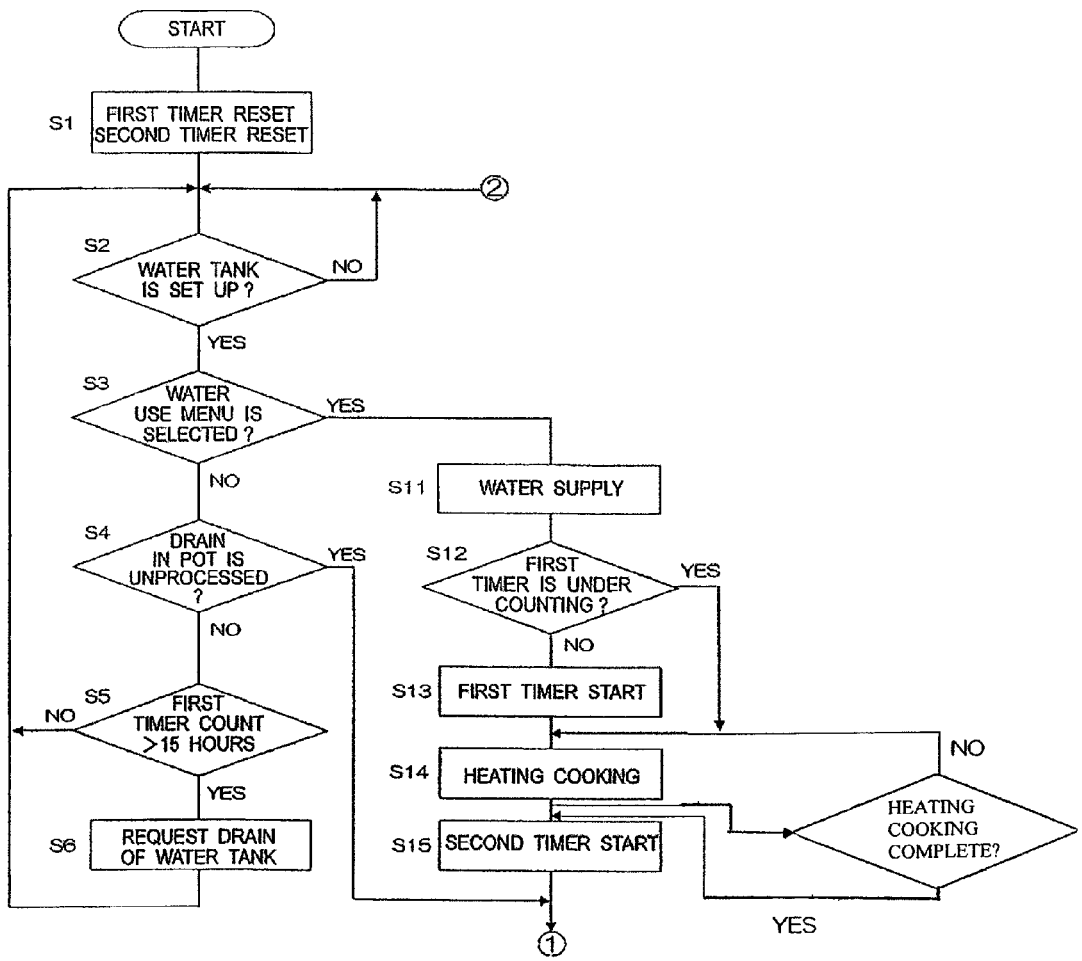
FIG. 6 is a flowchart for explaining operation of the control unit of the heating cooker.
Figure 7:
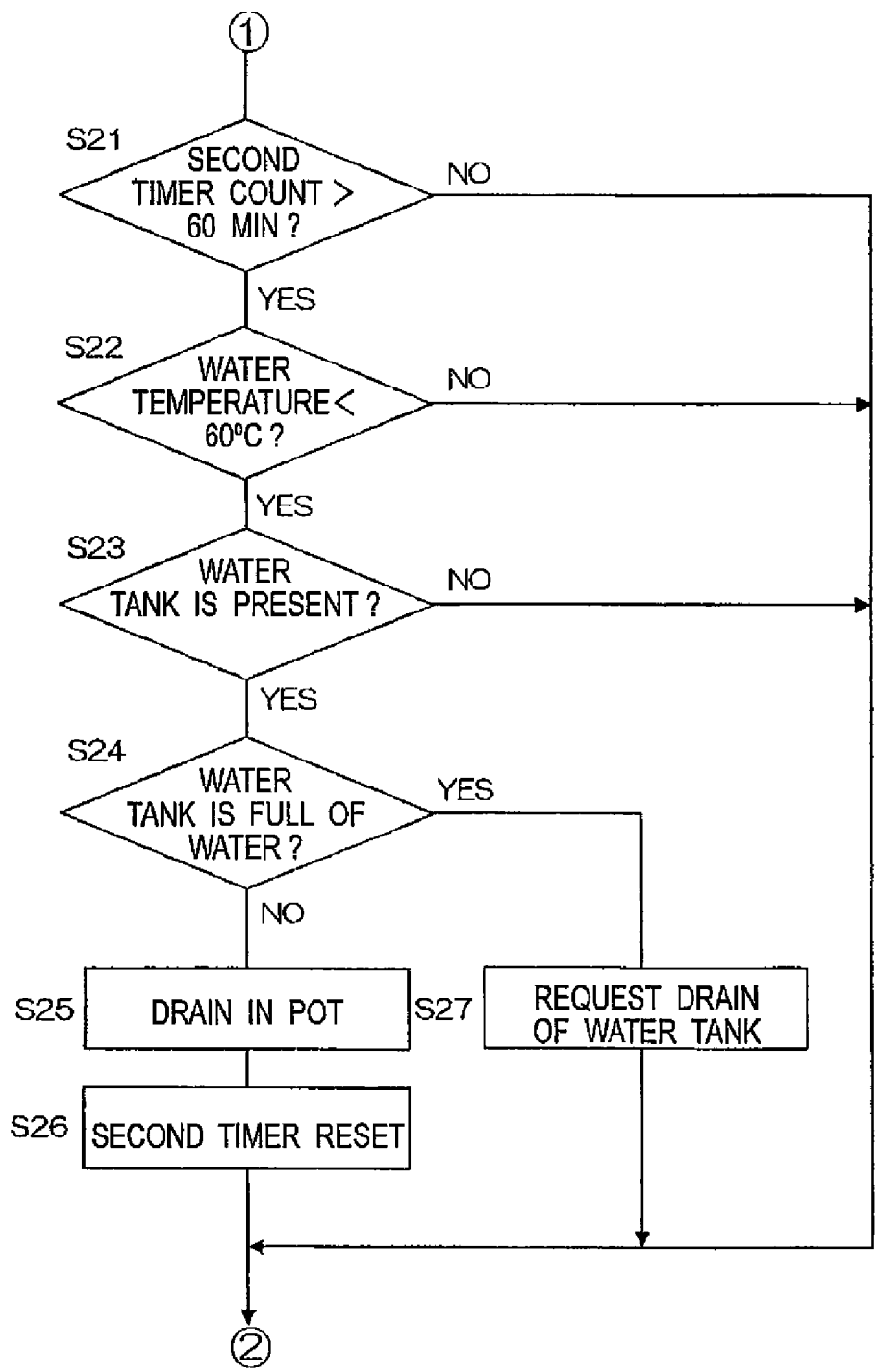
FIG. 7 is a flowchart succeeding to FIG. 6.

FIGS. 6 and 7 are flowcharts for explaining operation of the control unit 80 of the heating cooker 1. Water drain process of the water tank 30 and the steam generator 40 is described below with reference to FIGS. 6 and 7.

First, upon a start of the process, the first, second timers TM1, TM2 are reset at step S1 shown in FIG. 6.

Next, on a move to step S2, it is detected by the water tank sensor 73 whether or not the water tank 30 is set up. If the water tank 30 is not set up, the step S2 is iterated until the water tank 30 is set up; if the water tank 30 is set up, the program goes to step S3.

Next, at step S3, it is decided whether or not a water use menu has been selected by user's operation of the operation panel 11. If the water use menu has been selected, then the program goes to step S11.

Then, at step S11, the pump 35 is operated so that water is supplied into the pot 41 of the steam generator 40.

Next, on a move to step S12, it is determined whether or not the first timer TM1 is under counting operation. If the first timer TM1 is under counting operation, the program goes to step S14. If the first timer TM1 is not under counting operation, the program goes to step S13.

Next, at step S13, the first timer TM1 is started, so that the program goes to step S14.

Then, at step S14, heating cooking is performed according to a selected menu. Upon completion of the heating cooking (Yes in step S14'), the program goes to step S15, where the second timer TM2 is started, the program going to step S21 shown in FIG. 7.

Next, at step S21 shown in FIG. 7, it is determined whether or not the second timer TM2 counts 60 minutes (second specified time) or more. If the second timer TM2 counts 60 minutes or more, the program goes to step S22. If the second timer TM2 counts less than 60 minutes, the program returns to step S2 shown in FIG. 6.

Next, at step S22, it is determined whether or not the water temperature within the pot 41 of the steam generator detected by the pot water temperature sensor 47 is 60° C. (specified temperature) or lower. If the water temperature within the pot 41 is 60° C. or lower, then the program goes to step S23. On the other hand, if the water temperature within the pot 41 is over 60° C., then the program returns to step S2 shown in FIG. 6.

Next, at step S23, a fitting/removal state of the water tank 30 is detected by the water tank sensor 73, whether or not the water tank 30 is present is determined. Then, if the water tank 30 is present, the program goes to step S24. If the water tank 30 is not present, the program returns to step S2 shown in FIG. 6.

Next, at step S24, a water level within the water tank 30 is detected by the water-tank water level sensor 36, by which whether or not the water tank 30 is completely full of water. If the water tank 30 is not full with water, then the program goes to step S25, where the drain valve 70 is opened so that the water within the pot 41 is drained.

Next, on a move to step S26, the second timer TM2 is reset, and thereafter the program returns to step S2 shown in FIG. 6.

On the other hand, if it is determined at step S24 that the water tank 30 is full of water, then the program goes to step S27, where drain of the water tank 30 is requested. That is, there is displayed "Drain the water tank" on the display section of the operation panel 11, notifying the user of draining the water within the water tank 30. In this situation, no operation of the operation panel 11 but the drain operation associated with the water tank 30 is accepted. That is, key operations for performing heating cooking are not accepted.

Further, if it is determined at step S3 that the water use menu is not selected, the program goes to step S4, where it is determined whether or not the drain of the pot 41 has been processed. If the drain of the pot 41 has been processed, the program goes to step S5. If the drain of the pot 41 is unprocessed, the program goes to step S21 shown in FIG. 7.

Next, at step S5, it is determined whether or not the first timer TM1 counts 15 hours (first specified time) or more. If the first timer TM1 counts less than 15 hours, then the program returns to step S2. If the first timer TM1 counts 15 hours or more, the program goes to step S6.

Then, at step S6, drain of the water tank 30 is requested. In this situation also, as in the step S27, there is displayed "Drain the water tank" on the display section of the operation panel 11, notifying the user of draining the water tank 30, where no operation of the operation panel 11 but the drain operation associated with the water tank 30 is accepted. That is, key operations for performing heating cooking are not accepted.

As shown above, according to the heating cooker 1 of the above construction, water is supplied from the water tank 30 to the steam generator 40 by the pump 35 serving as a water supply section, and steam generated by the steam generator 40 is used for heating cooking. Then, residual water after the heating in the steam generator 40 is drained to the water tank 30 by the drain valve 70 serving as a drain section. Thus, remaining water in the steam generator 40 after the heating cooking is prevented from corroding, and moreover remaining water in the steam generator 40 after the heating cooking is returned to the water tank 30 so as to be recycled. In this heating cooker 1, when water is supplied to the steam generator 40 by the pump 35, the first timer TM1 is started to count. Then, at the time when the first timer TM1 counts the first specified time (15 hours in this embodiment), the control unit 80 makes the operation panel 11 including a notification section notify the user to drain the water within the water tank 30.

As a result, the user, after removing the water tank 30 and draining the water in the water tank 30, sets up the water tank 30 in which new water has been contained. Thus, an optimum water replacement responsive to deterioration of the water quality in the water tank 30 can be achieved.

Also, in the control unit 80, after the drain of the water in the pot 41 of the steam generator 40 by the drain valve 70 serving as a drain section and upon detection by the water tank sensor 73 that the water tank 30 has been removed, the control unit 80 resets the first timer TM1. Therefore, with the water tank 30 set up at the next time, when water is supplied to the steam generator 40 by the pump 35 serving as a water supply section, the first timer TM1 for drain control of the water tank 30 can be started to count anew.

Also, when steam generation by the steam generator 40 is ended after an end of heating cooking, the second timer TM2 is started to count. Then, when the second timer TM2 has counted over the second specified time (60 minutes in this embodiment), the control unit 80 opens the drain valve 70 serving as the drain section to drain the water in the pot 41 of the steam generator 40. Accordingly, high-temperature water in the steam generator 40 after heating cooking is not drained immediately, but drained as it has been lowered in temperature to some extent, so that the drain path and the water tank 30 can be prevented from being damaged by high heat.

Also, when the second timer TM2 has counted over the second specified time (60 minutes in this embodiment) and moreover the water level in the water tank 30 detected by the water-tank water level sensor 36 is not at a fullness of water, the control unit 80 opens the drain valve 70 to drain the water within the pot 41 of the steam generator 40. Accordingly, it can be prevented that draining water in the pot 41 with the water tank 30 at a fullness of water causes water to overflow from within the water tank 30.

Also, when the second timer TM2 has counted over the second specified time (60 minutes in this embodiment) and moreover the water level in the water tank 30 detected by the water-tank water level sensor 36 is at a fullness of water, the control unit 80 notifies the user to drain the water within the water tank 30, by the operation panel 11 including the notification section. As a result, the user may remove the water tank 30 to drain the water within the water tank 30 and then set up the empty or reduced-in-water-quantity water tank 30, by which water within the pot 41 of the steam generator 40 can be drained into the water tank 30.

Also, when the second timer TM2 has counted over the second specified time (60 minutes in this embodiment) and moreover it is detected by the water tank sensor 73 that the water tank 30 is not set up, the control unit 80 notifies the user to set up the water tank 30, by display (or voice) of the operation panel 11 including a notification section. As a result, the user may set up the empty or reduced-in-water-quantity water tank 30, by which water within the pot 41 of the steam generator 40 can be drained into the water tank 30.

Also, when the drain valve 70 serving as a drain section is opened and the water within the pot 41 of the steam generator 40 is drained, the control unit 80 resets the second timer TM2. Therefore, with water supplied to the steam generator 40 at the next time and after completion of heating cooking, when the steam generation by the steam generator 40 is ended, the second timer TM2 for drain control of the steam generator 40 can be started to count anew.

Also, after completion of heating cooking and moreover after an end of the steam generation by the steam generator 40, when the water temperature in the pot 41 of the steam generator 40 detected by the water temperature sensor has become the specified temperature (60° C. in this embodiment) or lower, the control unit 80 opens the drain valve 70 to drain the water within the pot 41. Accordingly, high-temperature water in the steam generator 40 after heating cooking is not drained immediately, but drained as it has been lowered in temperature to a specified temperature or lower, so that the drain path and the water tank 30 can be prevented from being damaged by high heat.

Also, when the first timer TM1 has counted over the first specified time (15 hours in this embodiment), the control unit 80 does not accept any keys for performing heating cooking on the operation panel 11, so that heating cooking is not started. Thus, it can be prevented that cooking is performed by using the water of deteriorated quality within the tank.

The foregoing embodiment has been described on a heating cooker using the steam generator 40 and the steam temperature-raising device 50. However, without being limited to this, the present invention may be applied to heating cookers in which steam derived from the steam generator is supplied to the heating chamber.

What is claimed is:

1. A heating cooker comprising:
   a steam generator for generating steam for heating cooking;
   a removable tank for storing water to be supplied to the steam generator;
   a water supply section for supplying water from the tank to the steam generator;
   a drain section for draining water within the steam generator into the tank;
   a first timer which starts counting from a time when water is supplied to the steam generator by an operation of the water supply section;
   a notification section for notifying of draining the water within the tank;
   a control unit for controlling the water supply section, the drain section and the notification section, wherein
   when the first timer has counted over a first specified time, the control unit makes the notification section notify of draining the water within the tank.

2. The heating cooker as claimed in claim 1, further comprising:
   a tank sensor for detecting a fitting/removal state of the tank, wherein
   when the tank sensor detects that the tank has been removed after the control unit has made the drain section drain the water within the steam generator into the tank, the control unit resets the first timer.

3. The heating cooker as claimed in claim 1, further comprising:
   a second timer which starts counting when, upon completion of heating cooking, generation of steam by the steam generator is ended, wherein
   when the second timer has counted over a second specified time, the control unit makes the drain section drain the water within the steam generator into the removable tank.

4. The heating cooker as claimed in claim 3, further comprising:
   a tank water level sensor for detecting a water level within the tank, wherein
   when the second timer has counted over the second specified time and moreover the water level within the tank detected by the tank water level sensor is not at a fullness of water, the control unit makes the drain section drain the water within the steam generator.

5. The heating cooker as claimed in claim 4, wherein
   when the second timer has counted over the second specified time and the water level within the tank detected by the tank water level sensor is at a fullness of water, the control unit makes the notification section notify of draining the water within the tank.

6. The heating cooker as claimed in claim 3, further comprising:
   a tank sensor for detecting a fitting/removal state of the tank, wherein
   the notification section has a function of notifying of setting up the tank, and
   when the second timer has counted over the second specified time and the tank sensor detects that the tank is not set up, the control unit makes the notification section notify of setting up the tank.

7. The heating cooker as claimed in claim 3, wherein
   when the water within the steam generator is drained by the drain section, the control unit resets the second timer.

8. The heating cooker as claimed in claim 1, further comprising:
a water temperature sensor for detecting a water temperature in the steam generator, wherein
when a water temperature in the steam generator detected by the water temperature sensor after completion of heating cooking and after an end of generation of steam by the steam generator has become a specified temperature or lower, the control unit makes the drain section drain the water within the steam generator.

9. The heating cooker as claimed in claim 1, further comprising:
a key input section for outputting to the control unit a signal corresponding to an inputted key, wherein
when the first timer has counted over the first specified time, the control unit prevents input from keys for performing heating cooking provided in the key input section.

10. A heating cooker, comprising:
a steam generator for generating steam for heating cooking;
a removable tank for storing water to be supplied to the steam generator;
a water supply section for supplying water from the tank to the steam generator;
a drain section for draining water within the steam generator into the tank;
a timer which starts counting upon completion of heating cooking;
a control unit for controlling the drain section, wherein
when the timer has counted over a specified time after completion of the heating cooking, the control unit makes the drain section drain the water within the steam generator to the removable tank.

* * * * *